US008677404B2

(12) United States Patent
Quinney et al.

(10) Patent No.: US 8,677,404 B2
(45) Date of Patent: Mar. 18, 2014

(54) SYSTEM AND METHOD FOR CONTROLLING VIDEO INPUTS TO A COMPUTER

(75) Inventors: Scott Quinney, Denver, CO (US); Greg Stewart, Niwot, CO (US)

(73) Assignee: GlobalFoundries Inc., Cayman Islands (KY)

( * ) Notice: Subject to any disclaimer, the term of this patent is extended or adjusted under 35 U.S.C. 154(b) by 1124 days.

(21) Appl. No.: 11/859,423

(22) Filed: Sep. 21, 2007

(65) Prior Publication Data

US 2009/0083789 A1    Mar. 26, 2009

(51) Int. Cl.
*H04N 5/445* (2011.01)
*G06F 3/00* (2006.01)

(52) U.S. Cl.
USPC .................... 725/38; 725/56; 725/57; 725/59

(58) Field of Classification Search
USPC ............................ 725/37–61; 348/705, 706
See application file for complete search history.

(56) References Cited

U.S. PATENT DOCUMENTS

| | | | | |
|---|---|---|---|---|
| 6,133,910 A * | 10/2000 | Stinebruner | | 725/49 |
| 6,529,680 B1 * | 3/2003 | Broberg | | 386/200 |
| 2001/0024240 A1 * | 9/2001 | Fujita et al. | | 348/705 |
| 2002/0140871 A1 * | 10/2002 | Piotrowski et al. | | 348/731 |
| 2003/0035007 A1 * | 2/2003 | Wugofski | | 345/764 |
| 2003/0156826 A1 * | 8/2003 | Sonoda et al. | | 386/83 |
| 2005/0179822 A1 * | 8/2005 | Takano et al. | | 348/705 |
| 2006/0236336 A1 * | 10/2006 | Chen | | 725/37 |
| 2007/0061842 A1 * | 3/2007 | Walter et al. | | 725/48 |
| 2007/0083888 A1 * | 4/2007 | Liebhold | | 725/37 |
| 2008/0310814 A1 * | 12/2008 | Bowra et al. | | 386/46 |

* cited by examiner

*Primary Examiner* — Vivek Srivastava
*Assistant Examiner* — Carmine Malangone
(74) *Attorney, Agent, or Firm* — Terrile, Cannatti, Chambers & Holland, LLP; Stephen A. Terrile (57) ABSTRACT

A system and method are disclosed for configuring video ports on a computer. An operating system is used to generate a visual user interface comprising a plurality of icons representing video input sources coupled to a tuner and a plurality of icons representing tuner output channels. A user provides input data to associate individual video input sources with individual tuner output channels, thereby generating a set of predetermined video source-channel associations. Appropriate control signals are then used to process video data in accordance with said predetermined video source-channel associations.

14 Claims, 6 Drawing Sheets

SYSTEM AND METHOD FOR CONTROLLING VIDEO INPUTS TO A COMPUTER

BACKGROUND OF THE INVENTION

1. Field of the Invention

The present invention relates in general to the field of computers used to display video information and, more particularly, to a method and system for controlling the video ports of a computer.

2. Description of the Related Art

In recent years there has been a rapid expansion in the use of personal computers for audio and video applications. Individuals now use numerous devices to provide video and audio input signals for personal computers. For example, a single user may have a digital camera, a camcorder, and a DVD that he wishes to use at various times.

To facilitate audio and video input, many computers now include a tuner card having multiple interface ports for various types of devices. Examples of video input ports include S-Video, coaxial, RCA, and composite input ports. In addition, tuners typically include stereo audio input ports.

Many current operating systems include media applications that allow the user to configure the tuner card to respond to input signals from a video input device. However, the media application in current operating systems only allows the tuner to be configured to respond to a single device that is coupled to only one of the video input ports. Furthermore, current media applications included with current operating systems do not allow a port to be configured unless a device is actually coupled to that port and is providing a live signal. An example of a current media application having the aforementioned limitations is "Media Center" that is distributed with Windows Vista®.

Because of the limitation discussed above, if a user initially configures a video port for one device and then wishes to attach a different device to a different port, it is then necessary to re-enter the tuner card configuration application and to re-configure the ports.

In view of the foregoing, there is a need for an improved system and method for managing the configuration and operation of video ports on a computer. Such a system is provided by the present invention, as described hereinbelow.

SUMMARY OF THE INVENTION

Embodiments of the present invention provide an audio/video control application that is operable to run on a computer as a user application and as a background add-in application. The portion of the application that is accessed by the user allows the user to select various tuner card inputs using a radio button interface. During the configuration process, the user is able to view the video content of the selected input through a thumbnail preview screen. The interface is used to assign each auxiliary input on the tuner card to a channel number for routing video input signals. When the audio visual application of the present invention is started, the background portion of the application is notified if a channel has been changed. If the new channel is one that the user has assigned to a different input, the video is routed appropriately. When the channel is changed off of an assigned auxiliary channel, the video is routed back to the primary source.

One embodiment of the invention provides a method for configuring video ports on a computer. The method comprises: using an operating system to generate a visual user interface, said user interface comprising a plurality of icons representing video input sources coupled to a tuner and a plurality of icons representing tuner output channels; receiving input data to associate plural individual video input sources in said plurality of video input sources with plural individual tuner output channels in said plurality of tuner output channels, thereby generating a set of predetermined video source-channel associations; and generating control signals to control said tuner to process video data in accordance with said predetermined video source-channel associations.

Another embodiment of the invention provides a system for capturing video data. The system comprises: a plurality of ports for receiving video data; a tuner comprising a switch operable to control individual ports in said plurality of ports; a processor operable to generate control signals to control said switch and to execute an operating system to generate a visual user interface comprising a plurality of icons representing video input sources coupled to said tuner and a plurality of icons representing tuner output channels; and a user data input device operable to generate data to associate plural individual video input sources in said plurality of video input sources with plural individual tuner output channels in said plurality of tuner output channels, thereby generating a set of predetermined video source-channel associations; wherein said control signals generated by said processor are used to process video data in accordance with said predetermined video source-channel associations.

Yet another embodiment of the invention provides a computer-usable medium embodying computer program code for use by a computer comprising a plurality of ports for receiving video data, the computer program code comprising computer executable instructions configured for: using an operating system to generate a visual user interface, said user interface comprising a plurality of icons representing video input sources coupled to a tuner and a plurality of icons representing tuner output channels; receiving input data to associate plural individual video input sources in said plurality of video input sources with plural individual tuner output channels in said plurality of tuner output channels, thereby generating a set of predetermined video source-channel associations; and generating control signals to control said tuner to process video data in accordance with said predetermined video source-channel associations.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
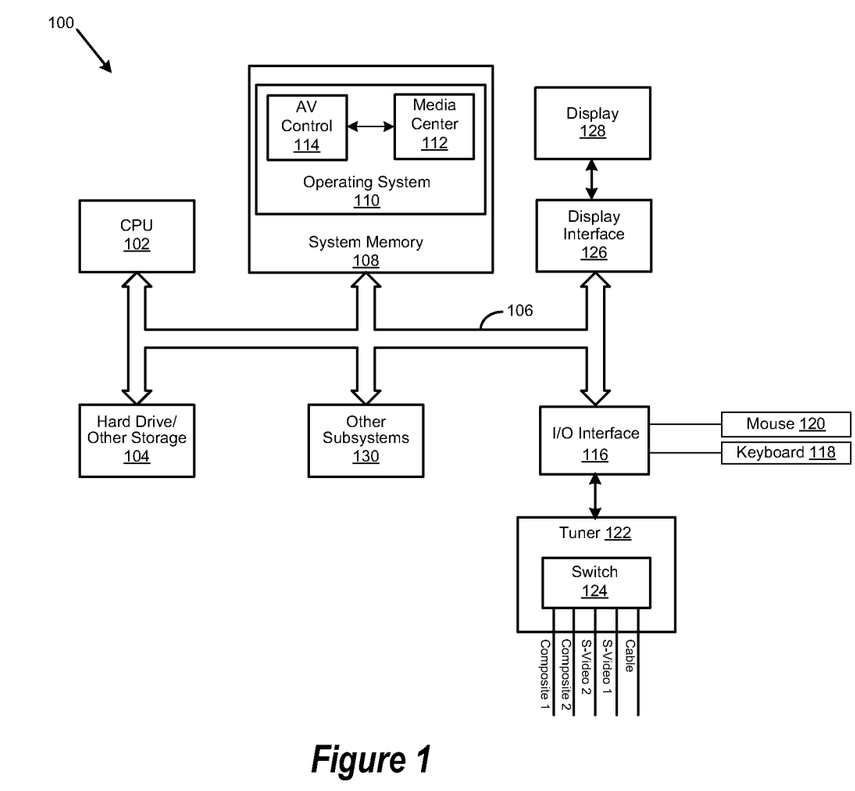
FIG. 1 is a block diagram illustration of the system components for a typical PC architecture for receiving, processing and displaying video images.

FIG. 1 is an illustration of a computer system 100 that can be used to implement embodiments of the present invention. The computer system 100 includes a processor 102 that is operable to execute programs stored on the hard drive 104 or other storage devices. Data is transferred between the various system components via various data buses illustrated generally by bus 106. In various embodiments of the invention, programs stored on the hard drive 104 are stored in system memory 108. In some embodiments of the invention, the operating system 110 used to control operation of the computer 100 is Windows Vista®. In those embodiments, the operating system comprises a media application, "Media Center" 112 that has the limitations discussed hereinabove. The media application of the present invention, hereinafter referred to as "AV Control" 114 is operable to provide enhanced audio/video functionality for computers using the audio/visual Media Center application that is provided with the Windows Vista® operating system.

Computer system 100 comprises an input/output (I/O) interface 116 that is operable to provide support for keyboard 118 and a mouse 120. In various embodiments of the invention, the I/O interface 116 is coupled to a tuner 122 that comprises a switch 124 that is operably coupled to a plurality of audio-video input ports. For example, the tuner may comprise S-Video ports, coaxial ports, RCA ports, and composite input ports. In addition, the tuner may include stereo audio input ports. The tuner 122 is operable to process incoming video signals in accordance with either the NTSC standard or the ATSC standard. The switch 124 controls operation of the various video ports in response to commands from the processor 102 in the computer system 100. In various embodiments of the invention, video signals received via the I/O interface 118 are processed by the processor 102 using the Microsoft Windows Vista® operating system 110, Media Center 112, and the AV control application 114 to generate video signals that are further processed by video interface 126 and displayed on display 128. In addition to the various functional modules discussed hereinabove, the computer 100 comprises other subsystems 130 known to those of skill in the art.

Although the tuner switch 124 is capable of rapidly switching between the various video input ports in real-time, the Media Center application in Windows Vista® does not allow multiple ports to be configured simultaneously. Therefore, the capabilities of the tuner are not fully utilized. The AV control application of the present invention allows a user to enable various audio and video input ports that are otherwise unusable by the media control application, e.g., Media Center, currently available in operating systems. The present invention allows a user to configure the system to allow a plurality of ports to be simultaneously configured and assigned to predetermined channels. In addition, embodiments of the present invention allow ports to be assigned to channels without a device actually attached to the port.

Figure 2A:
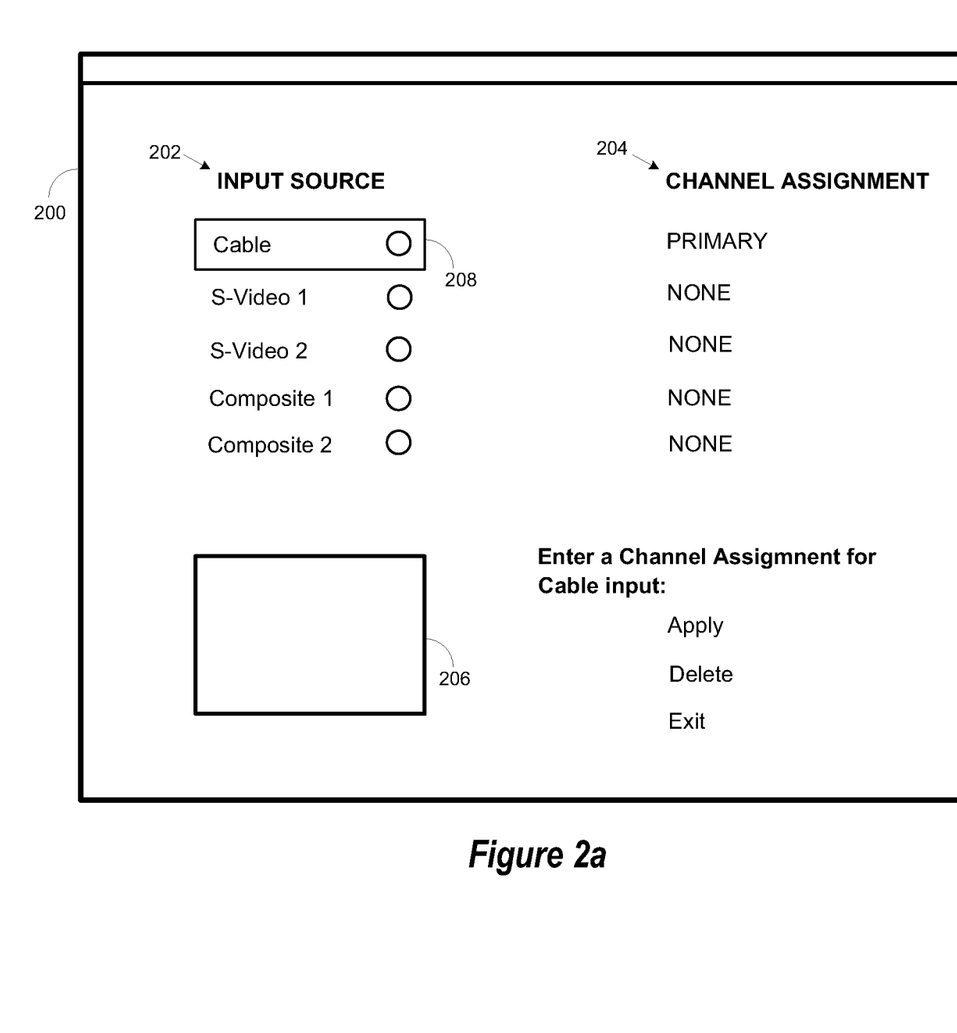
FIG. 2A is an illustration of the user interface of the media control application of the present invention showing the default initial configuration of ports of a computer.

FIG. 2A is an illustration of an embodiment of the user interface for use in conjunction with the AV control application of the present invention. The interface comprises an input source column 202, a channel assignment column 204, and a preview window 206. The illustration of the interface shown in FIG. 2A shows the default assignments at the beginning of the initial setup of the system. In the initial configuration, the cable input source is assigned to the primary channel. If a video signal is being provided at the cable source, the video image received through the cable input port will be shown in the preview display box 206.

Figure 2B:
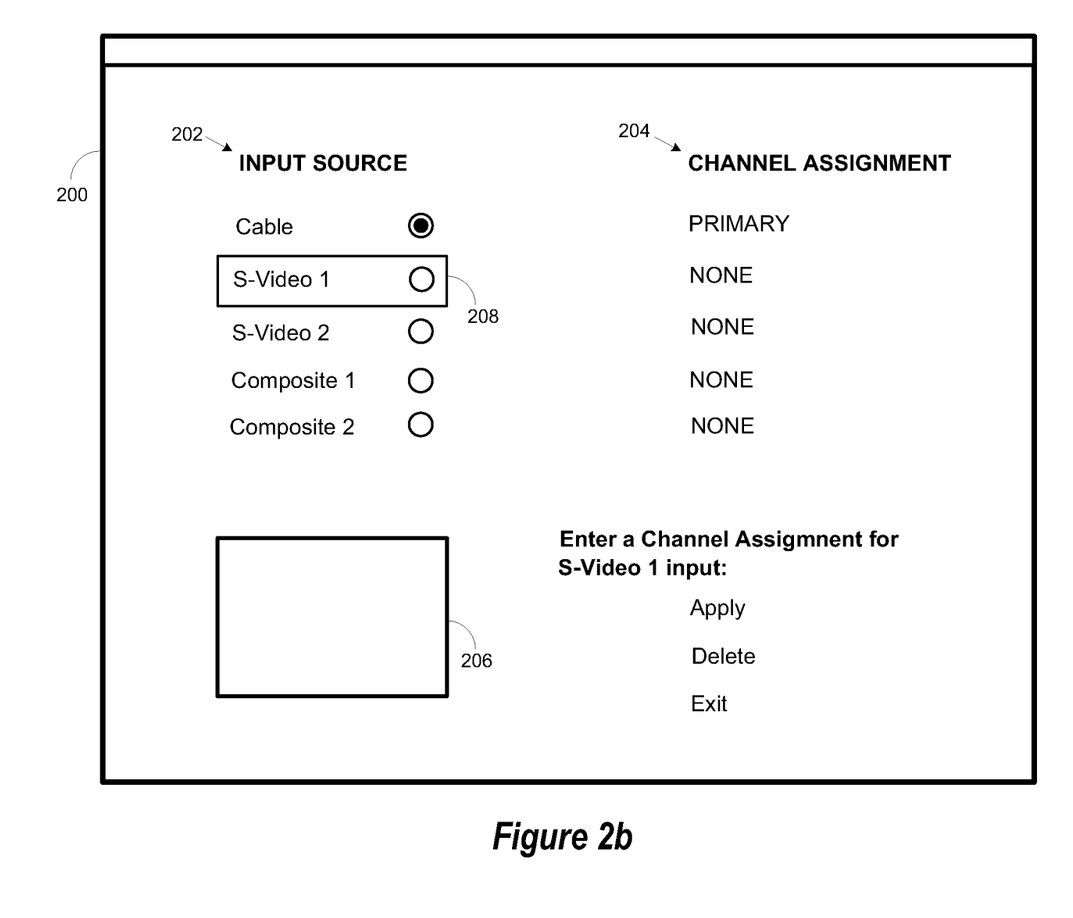
FIG. 2B is an illustration of the user interface of the media control application of the present invention showing a selection box placed over an input source to modify the configuration of ports of a computer.
Figure 2C:
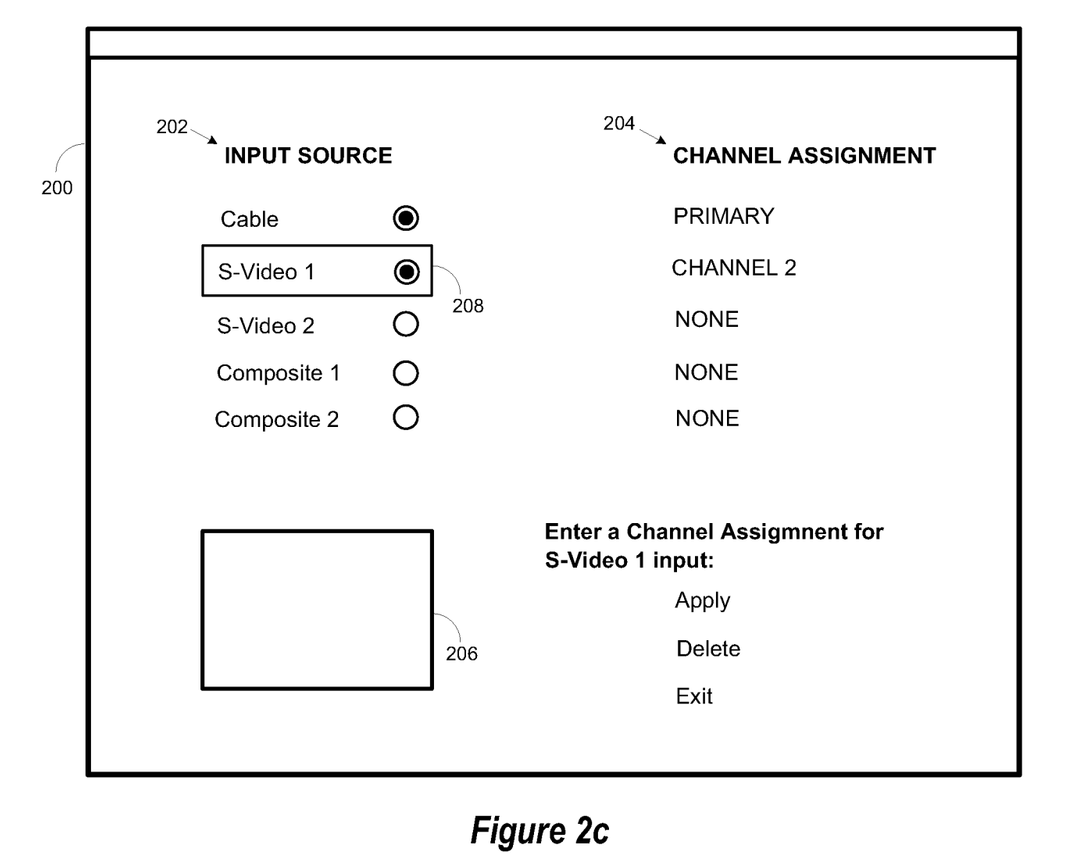
FIG. 2C is an illustration of the user interface of the media control application of the present invention showing a selection box placed over a channel assignment input port to modify the configuration of ports of a computer.

FIG. 2B is an illustration of the first step in changing the configuration of the ports in the computer system 100 using the AV control application of the present invention. A selection indicator 208 is positioned around the S-video 1 input source in response to an input from a user via a radio button interface. With the selection box positioned over the S-video 1 source icon, the user can change the channel assignment using a computer keyboard or the number pad on the radio button interface. If for example the user pressed the number "2" on the number pad of the radio button interface, channel 2 will then appear as the channel assignment shown on interface 200 for the S-video input source as shown in FIG. 2C. It will be understood that it is not possible to assign a channel to the selected source if that channel has already been designated as the primary input source for the system. Once the user has selected an appropriate channel number, the configuration is then updated by clicking "apply" with the radio button interface. Alternatively, the user can use a mouse to position a pointer over the "Apply" icon on the interface and then click a mouse button to finalize the modification.

Figure 3:
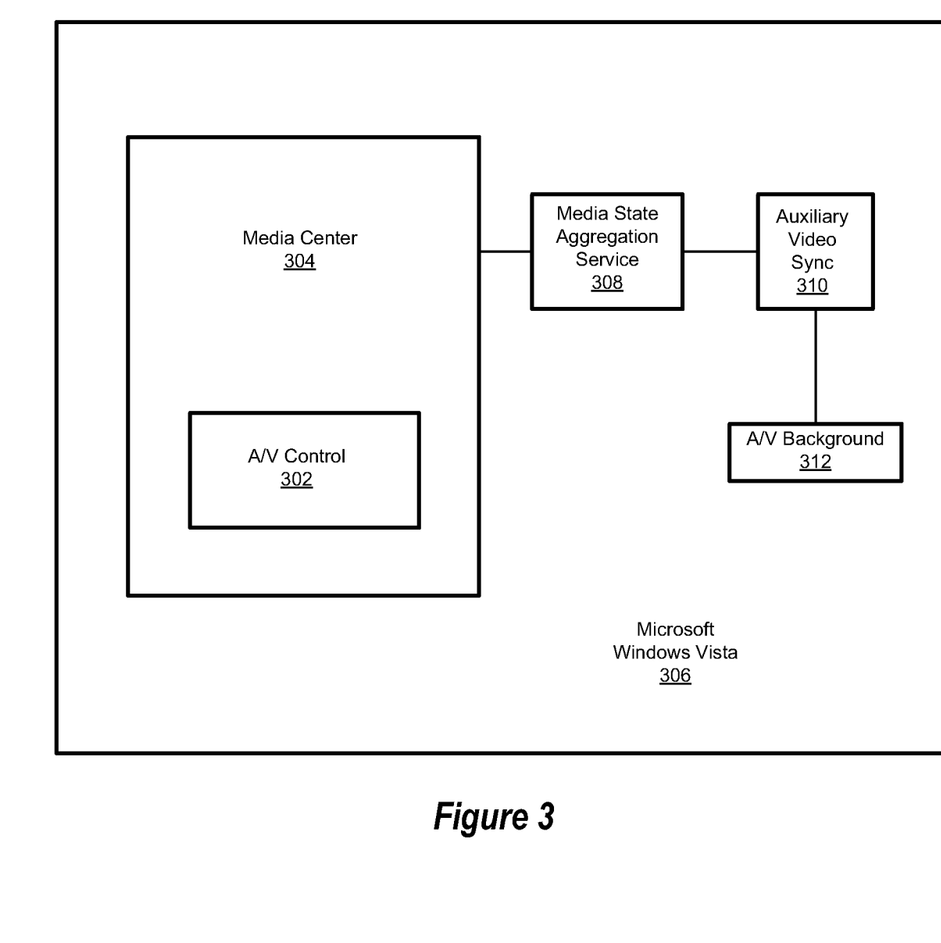
FIG. 3 is an illustration of the functional components of an embodiment of the media control application of the present invention.

FIG. 3 is a block diagram illustration of the functional components that are used to implement the audio/video media control application of the present invention. As discussed hereinabove, the audio/video media control application comprises a user module, AV Control 302, that resides in the Media Center module 304 of the Microsoft Windows Vista® operating system 306 and an AV background application. When a user changes the configuration of the ports using the AV control application, data corresponding to the changes is stored in a registry. As the user views live television from within the Media Center, the Media State Aggregation Service (MSAS) module 308 detects user-initiated actions and broadcasts information regarding the changes. The auxiliary video sync module 310 receives the change information broadcast by the MSAS and determines whether the change relates to a new channel number for television viewing and, if so, generates a message to wake up the AV background application 312. The AV background application 312 then checks the registry to determine if the channel change is related to the video port designations. The AV background application then generates appropriate control codes that are used by the processor to generate control signals to control the tuner switch to route the incoming video signals.

Figure 4:
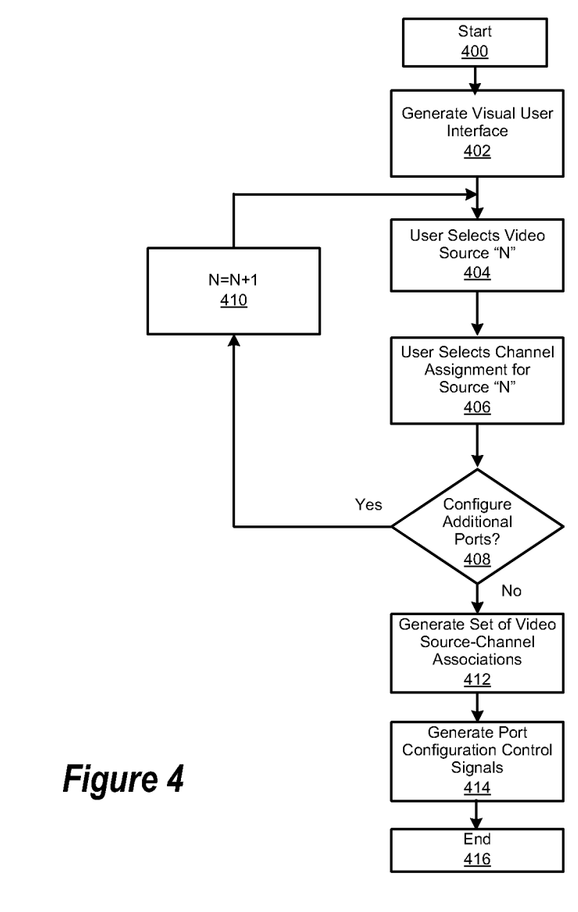

FIG. 4 is a flowchart of the processing steps implemented in an embodiment of the invention. In step 400, processing is initiated, followed by generation of a visual user interface, as described hereinabove, in step 402. In step 404, the user selects a video source "N," and in step 406, the user selects a channel assignment for association with source "N." In step 408, a decision is made regarding the configuration of additional ports. If additional ports are to be configured, processing proceeds to step 410 where "N" is incremented and steps 404, 406 are repeated. If no additional ports are to be configured, processing proceeds to step 412 where a set of video source-channel associations are generated. In step 414, configuration control signals are generated to route incoming video data in accordance with the video source-channel associations generated in step 412. Processing is then ended in step 616.

As will be appreciated by one skilled in the art, the present invention may be embodied as a method, system, or computer program product. Accordingly, embodiments of the invention may be implemented entirely in hardware, entirely in software (including firmware, resident software, micro-code, etc.), or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus or device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. In the context of this document, a computer-usable or computer-readable medium may be any medium that can contain, store, communicate, propagate, or transport the program for use by or in connection with the instruction execution system, apparatus, or device.

OTHER EMBODIMENTS

Other embodiments are within the following claims. Although the present invention has been described in detail, it should be understood that various changes, substitutions and alterations can be made hereto without departing from the spirit and scope of the invention as defined by the appended claims.

What is claimed is:

1. A method for configuring ports on a computer, comprising:
    using an operating system to generate a visual user interface, said operating system comprising a registry and said user interface comprising a plurality of icons representing video input sources coupled to a tuner and a plurality of icons representing tuner output channels, the plurality of icons representing video input sources coupled to the tuner and the plurality of icons representing tuner output channels being presented via a single user interface presentation so as to allow configuration of a plurality of ports via the single user interface presentation, the single user interface presentation further comprising a preview display portion;
    receiving input data to associate plural individual video input sources in said plurality of video input sources with plural individual tuner output channels in said plurality of tuner output channels,
    processing said input data to directly generate a set of video source-channel associations, said set of video source-channel associations being stored in said registry; and
    receiving input data to retrieve individual video source-channel associations within said set of video source-channel associations from said registry, said set of video source-channel associations being used to generate control signals to control said tuner to process video data in accordance with said video source-channel associations; and wherein said preview display portion presenting video content of a selected input of the video input sources; one of said plural individual video input sources is automatically assigned and labeled in an initial default configuration screen of the single user interface presentation as a primary channel; said input data to associate plural individual video input sources comprises keyboard input data and radio button interface input data; and when said control signals to control said tuner indicate said tuner to a channel change, said registry is checked to determine if said channel change is associated with said set of video source-channel associations.

2. The method of claim 1, wherein said registry comprises a database.

3. The method of claim 1, wherein said operating system further comprises a media state aggregation service module operable to broadcast information relating to said set of video source-channel associations.

4. The method of claim 3, wherein said operating system further comprises a control application operable to receive said broadcast information and to generate control codes in response thereto.

5. The method of claim 4, wherein said computer comprises a processor operable to use said control codes to generate control signals to control the capture of video data by said tuner.

6. A system for capturing video data, comprising:
    a plurality of ports for receiving video data;
    a tuner comprising a switch operable to control individual ports in said plurality of ports;
    a processor operable to generate control signals to control said switch and to execute an operating system to generate a visual user interface, said operating system comprising a registry and said user interface comprising a plurality of icons representing video input sources coupled to said tuner and a plurality of icons representing tuner output channels, the plurality of icons representing video input sources coupled to the tuner and the plurality of icons representing tuner output channels being presented via a single user interface presentation so as to allow configuration of a plurality of ports via the single user interface presentation, the single user interface presentation further comprising a preview display portion; and
    a user data input device operable to generate data to directly associate plural individual video input sources in said plurality of video input sources with plural individual tuner output channels in said plurality of tuner output channels, thereby generating a set of video source-channel associations, said source-channel associations being stored in said registry;
    wherein upon receiving input data to retrieve individual video source-channel associations within said set of video source-channel associations from said registry, said set of video source-channel associations is used by said processor to generate said control signals used to process video data in accordance with said video source-channel associations; and wherein said preview display portion presenting video content of a selected input of the video input sources; one of said plural individual video input sources is automatically assigned and labeled in an initial default configuration screen of the single user interface presentation as a primary channel; said input data to associate plural individual video input sources comprises keyboard input data and radio button interface input data; and when said control signals to control said tuner indicate said tuner to a channel change, said registry is checked to determine if said channel change is associated with said set of video source-channel associations.

7. The system of claim 6, wherein said registry comprises a database.

8. The system of claim 6, wherein said operating system further comprises a media state aggregation service module operable to broadcast information relating to said set of video source-channel associations.

9. The system of claim 8, wherein said operating system further comprises a control application operable to receive said broadcast information and to generate control codes in response thereto.

10. A non-transitory computer-usable medium embodying computer program code for use by a computer comprising a plurality of ports for receiving video data, the computer program code comprising computer executable instructions configured for:

using an operating system to generate a visual user interface, said operating system comprising a registry and said user interface comprising a plurality of icons representing video input sources coupled to a tuner and a plurality of icons representing tuner output channels, the plurality of icons representing video input sources coupled to the tuner and the plurality of icons representing tuner output channels being presented via a single user interface presentation so as to allow configuration of a plurality of ports via the single user interface presentation, the single user interface presentation further comprising a preview display portion;

receiving input data to associate plural individual video input sources in said plurality of video input sources with plural individual tuner output channels in said plurality of tuner output channels, processing said input data to directly generate a set of video source-channel associations, said set of video source-channel associations being stored in said registry; and receiving input data to retrieve individual video source-channel associations within said set of video source-channel associations from said registry, said set of video source-channel associations being used to generate control signals to control said tuner to process video data in accordance with said video source-channel associations; and wherein said preview display portion presenting video content of a selected input of the video input sources; one of said plural individual video input sources is automatically assigned and labeled in an initial default configuration screen of the single user interface presentation as a primary channel; said input data to associate plural individual video input sources comprises keyboard input data and radio button interface input data; and when said control signals to control said tuner indicate said tuner to a channel change, said registry is checked to determine if said channel change is associated with said set of video source-channel associations.

11. The non-transitory computer-usable medium of claim 10, wherein said registry comprises a database.

12. The non-transitory computer-usable medium of claim 10, wherein said operating system further comprises a media state aggregation service module operable to broadcast information relating to said predetermined set of video source-channel associations.

13. The non-transitory computer-usable medium of claim 12, wherein said operating system further comprises a control application operable to receive said broadcast information and to generate control codes in response thereto.

14. The non-transitory computer-usable medium of claim 13, wherein said computer comprises a processor operable to use said control codes to generate control signals to control the capture of video data by said tuner.

* * * * *